United States Patent
Berta et al.

(10) Patent No.: US 6,615,475 B2
(45) Date of Patent: Sep. 9, 2003

(54) METHOD FOR MAKING VEHICLE DOOR

(75) Inventors: Michael J. Berta, Rochester Hills, MI (US); Klaus Witte, Hofheim (DE); Holger Reusswig, Dietzenbach (DE); Jeffery W. Kolar, Livonia, MI (US); Thomas J. Strickland, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/241,211

(22) Filed: Sep. 11, 2002

(65) Prior Publication Data

US 2003/0011209 A1 Jan. 16, 2003

Related U.S. Application Data

(62) Division of application No. 09/690,635, filed on Oct. 17, 2000, now Pat. No. 6,453,615.

(51) Int. Cl.[7] ............................................ B23P 21/00
(52) U.S. Cl. ............................................. 29/469; 29/434
(58) Field of Search ..................... 49/349, 352, 348, 49/502; 29/434, 469

(56) References Cited

U.S. PATENT DOCUMENTS

| | | | |
|---|---|---|---|
| 4,785,585 A | 11/1988 | Grier et al. | |
| 4,800,638 A * | 1/1989 | Herringshaw et al. | ........ 29/469 |
| 4,831,710 A * | 5/1989 | Katoh et al. | ................... 29/434 |
| 4,882,842 A | 11/1989 | Basson et al. | |
| 4,890,376 A * | 1/1990 | Boileau | ........................ 29/434 |
| 5,050,350 A | 9/1991 | Bertolini et al. | |
| 5,095,659 A | 3/1992 | Benoit et al. | |
| 5,117,549 A * | 6/1992 | Gaudreau | ....................... 29/469 |
| 5,121,534 A * | 6/1992 | Kruzich | ......................... 29/469 |
| 5,535,553 A | 7/1996 | Staser et al. | |
| 5,555,677 A | 9/1996 | DeRees et al. | |
| 5,617,675 A | 4/1997 | Kobrehel | |
| 5,715,630 A | 2/1998 | Szerdahelyi et al. | |
| 5,805,402 A | 9/1998 | Maue et al. | |
| 5,819,473 A | 10/1998 | Hashimoto et al. | |
| 5,857,732 A | 1/1999 | Ritchie | |
| 5,867,942 A | 2/1999 | Kowalski | |
| 5,904,002 A | 5/1999 | Emerling et al. | |
| 5,907,897 A * | 6/1999 | Hisano | ........................ 29/434 |
| 5,927,020 A | 7/1999 | Kobrehel | |
| 5,927,021 A | 7/1999 | Kowalski et al. | |
| 6,134,840 A | 10/2000 | Pleiss | |
| 2002/0162208 A1 * | 11/2002 | Wurm et al. | ................... 29/469 |

* cited by examiner

*Primary Examiner*—David P. Bryant
(74) *Attorney, Agent, or Firm*—Brooks & Kushman P.C.

(57) ABSTRACT

A vehicle door (10) and subassembly (16) thereof are made by mounting vehicle door hardware including a door latch actuator mechanism (32) and a window regulator mechanism (34) directly on a hidden surface (28) of a lower trim panel portion (20) of an inner trim panel (18) that also includes an upper trim panel portion (22). A wire harness (50) is also mounted directly on the hidden surface (28) of the lower trim panel portion (20) of the inner trim panel (18). The window regulator mechanism (34) has a construction that permits pivoting thereof to facilitate assembly within a vehicle door outer structure (12).

5 Claims, 3 Drawing Sheets

METHOD FOR MAKING VEHICLE DOOR

This is a divisional of application(s) Ser. No. 09/690,635 filed on Oct. 17, 2000, now U.S. Pat. No. 6,453,615.

BACKGROUND OF THE INVENTION

1. Field of the Invention

This invention relates to a vehicle door subassembly, to a vehicle door, and to a method for making the vehicle door.

2. Background Art

Vehicle doors conventionally include a vehicle door outer structure on which vehicle door hardware and other components are mounted to provide door operating functions, and an inner trim panel is secured to the door outer structure to enclose the hardware and other door components. More specifically, a door latch actuator mechanism and a window regulator mechanism as well as a wire harness for controlling door locking and unlocking, power operated window movement, door rearview mirror adjustment, and on some vehicles seat adjustment, etc. are controlled by switches that function through the wire harness. Modular door assembly to facilitate door manufacturing has previously included a carrier member on which the vehicle door hardware and other door components are mounted for assembly to the door outer structure such as disclosed by U.S. Pat. Nos.: 4,785,585 Grier et al.; 4,882,842 Basson et al.; 5,095,659 Benoit et al.; 5,535,553 Staser et al.; 5,715,630 Szerdahelyi et al.; 5,805,402 Maue et al.; 5,819,473 Hashimoto et al.; 5,857,732 Ritchie; 5,867,942 Kowalski; 5,904,002; Emerling et al.; and 5,927,021 Kowalski et al.

Door component carrier members while permitting modular door assembly necessarily involved cost and also add weight to the assembled vehicle door.

SUMMARY OF THE INVENTION

One object of the present invention is to provide an improved vehicle door subassembly that includes an inner trim panel having a lower trim panel portion and an upper trim panel portion. The lower and upper trim panel portions each include an exposed surface for facing inwardly toward to the vehicle occupant compartment after assembly to a vehicle door outer structure. The lower and upper trim panel portions each also include a hidden surface for facing toward the vehicle door outer structure after assembly thereto. Vehicle door hardware including a door latch actuator mechanism and a window regulator mechanism are mounted directly on the hidden surface of the lower trim panel portion of the inner trim panel.

The above construction of the vehicle door subassembly eliminates the need for a carrier and the consequent cost and weight involved with the use of such carriers as was the case in prior art vehicle doors.

In the preferred construction of the vehicle door subassembly, a wire harness is also mounted directly on the hidden surface of the lower trim panel portion of the inner trim panel. In addition, an audio speaker may also be directly mounted on the hidden surface of the lower trim panel portion of the inner trim panel. Furthermore, the upper trim panel portion of the inner trim panel of the vehicle door subassembly may also have a front end including a rearview mirror cover.

The preferred construction of the window regulator mechanism of the vehicle door assembly includes a pair of elongated window guides for supporting an associated door window for vertical movement. A pair of pivotal connection respectively mount the pair of window guides for pivotal movement to facilitate installation of the vehicle door subassembly on a vehicle door. A cable of the window regulator mechanism extends along each window guide between ends thereof and also extends between the pair of window guides in a crossing manner. The cable guides have a pair of window connectors respectively associated with the pair of window guides, with one of the window guides having an intermediate portion including a drive motor that drives the cable to move the window, and with the other window guide having an intermediate portion including a pulley over which the cable extends to facilitate the pivoting of the pair of window guides for installation.

Another object of the present invention is to provide an improved vehicle door.

In carrying out the immediately preceding object, the vehicle door of the invention includes a metallic door outer structure having an inwardly facing side that faces toward the vehicle occupant compartment after assembly to the associated vehicle. An inner trim panel of the door includes a lower trim panel portion and an upper trim panel portion secured to the door outer structure. The lower and upper trim panel portions each include an exposed surface that faces inwardly toward the vehicle occupant compartment after assembly, and the lower and upper trim panel portions each also include a hidden surface that faces toward the vehicle door outer structure. Vehicle door hardware of the door includes a door latch actuator mechanism and a window regulator mechanism mounted directly on the hidden surface of the lower trim panel portion of the inner trim panel and also secured to the door outer structure.

In the preferred construction, the vehicle door also includes a vehicle wire harness mounted directly on the hidden surface of the lower trim panel portion of the inner trim panel. The vehicle door may also include an audio speaker mounted directly on the hidden surface of the lower trim panel portion of the inner trim panel. Furthermore, the upper trim panel portion may have a front end including a rearview mirror cover.

The preferred construction of the window regulator mechanism of the vehicle door includes a pair of elongated window guides for supporting an associated door window for vertical movement. A pair of pivotal connection respectively mount the pair of window guides for pivotal movement to facilitate installation of the vehicle door subassembly on a vehicle door. A cable of the window regulator mechanism extends along each window guide between ends thereof and also extends between the pair of window guides in a crossing manner. The cable guides have a pair of window connectors respectively associated with the pair of window guides, with one of the window guides having an intermediate portion including a drive motor that drives the cable to move the window, and with the other cable extends to facilitate the pivoting of the pair of window guides for installation.

A further object of the invention is to provide a method for making a vehicle door.

In carrying out the immediately preceding object, the method for making a vehicle door in accordance with the invention includes mounting vehicle door hardware including a door latch actuator mechanism and a vehicle window regulator mechanism directly to an inner surface of a lower portion of an inner trim panel. Assembling of the lower portion of the inner trim panel and the door hardware to a metallic door outer structure in accordance with the invention is followed by finally securing an upper portion of the inner trim panel to the door outer structure above the lower portion of the inner trim panel.

In the preferred practice of the vehicle door making method of the invention, a wire harness is also mounted directly on the hidden surface of the lower trim panel portion of the inner trim panel.

The vehicle door making method is most preferably performed by having a lower extremity of the lower portion of the inner trim panel initially supported on a lower extremity of the outer door structure and the lower portion of the inner trim panel is subsequently pivoted into position for securement to the door outer structure. Furthermore, the upper portion of the inner trim panel is secured to the door outer structure with a front end having a rearview mirror cover.

The objects, features and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
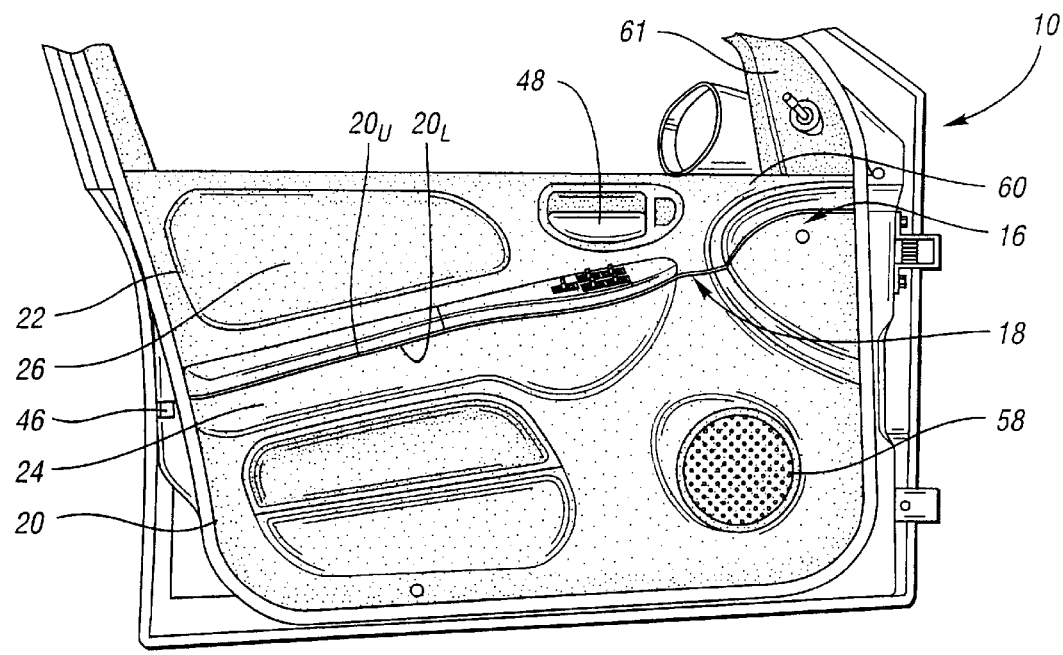
FIG. 1 is a view of a vehicle door that is constructed in accordance with the invention and made according to the method thereof and also includes a vehicle door subassembly of the invention.
Figure 4:
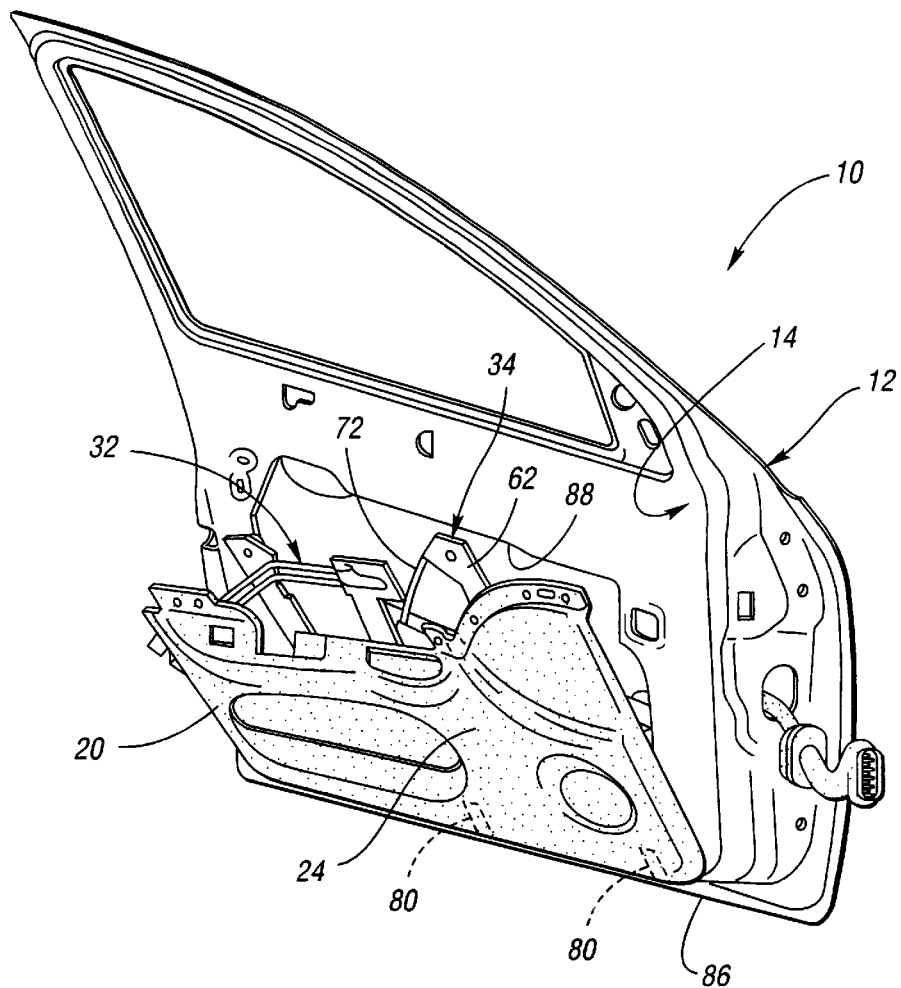
FIG. 4 is a view that illustrates the manner in which the vehicle door subassembly is assembled on the vehicle door outer structure.
Figure 5:
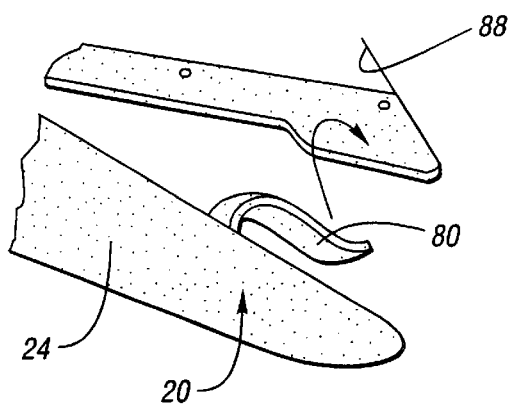
FIG. 5 is a view that further illustrates the manner in which the vehicle door subassembly is initially supported on the vehicle door for assembly.

With reference to FIG. 1, a vehicle door generally indicated by 10 is constructed in accordance with the present invention and includes a metallic door outer structure 12 that is illustrated in FIG. 4 as having an inwardly facing side 14 that faces toward the associated vehicle occupant compartment after assembly to the associated vehicle in a conventional manner through the use of unshown door hinges. The door 10 shown in FIG. 1 also includes a vehicle door subassembly 16 that is constructed in accordance with the present invention and also shown in FIG. 2. The door 10, the subassembly 16 and the method of making the door will be described below in an integrated manner to facilitate an understanding of all aspects of this invention.

Figure 2:
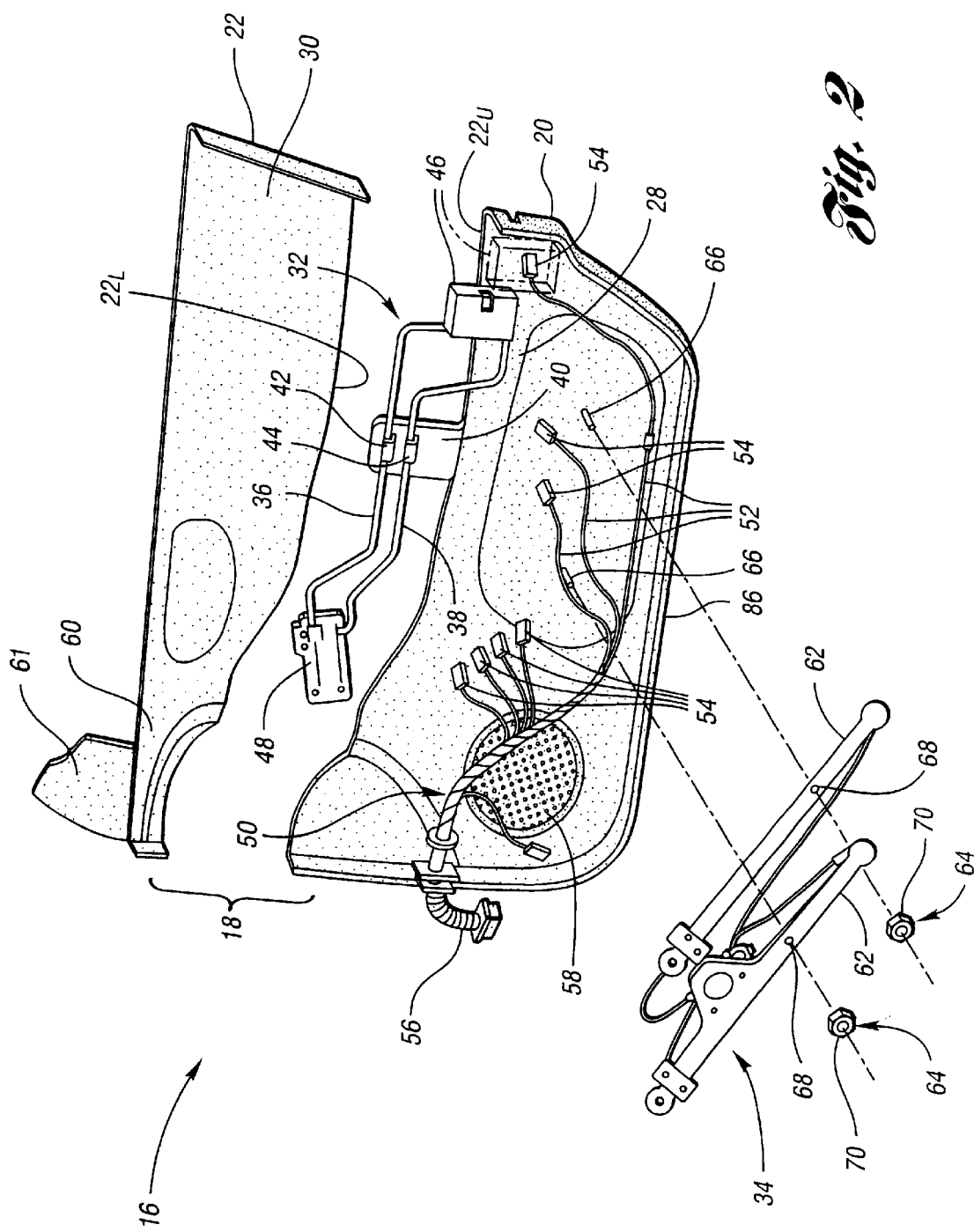
FIG. 2 is a perspective view of the hidden side of the vehicle door subassembly which includes an inner trim panel having a lower trim panel portion and an upper trim panel portion.

The vehicle door subassembly 16 as shown in FIG. 2 includes an inner trim panel 18 having a lower trim panel portion 20 and an upper trim panel portion 22. The lower and upper trim panel portions 20 and 22 as shown in FIG. 1 each include an exposed surface 24, 26 for facing inwardly toward the vehicle occupant compartment after assembly to the vehicle door outer structure as is hereinafter more fully described. The lower and upper trim panel portions 20 and 22 are conventionally made from plastic resin by a suitable molding process and as shown in FIG. 2 also each includes a hidden surface 28, 30 for facing toward the vehicle door outer structure 12 (FIG. 4) after assembly thereto in accordance with the assembly method of the invention. Vehicle door hardware of the vehicle door subassembly 16 is shown in FIG. 2 as including a door latch actuator mechanism 32 and a window regulator mechanism 34 that are mounted directly on the hidden surface 28 of the lower trim panel portion 22 of the inner trim panel 18 to facilitate the assembly of the door. More specifically, the door latch actuator mechanism 32 has actuating links 36 and 38 that are mounted on a flange 40 of the lower trim panel portion 28 with connectors 42 and 44 supporting intermediate portions of the links. The door latch actuator mechanism links 36 and 38 have first ends connected to door latch 46 and have second ends connected to an actuating handle mechanism 48 for operating the latch in a conventional manner. The construction of the window regulator mechanism 34 is hereinafter more fully described in connection with FIG. 3.

With continuing reference to FIG. 2, the vehicle door subassembly 16 also includes a wire harness 50 mounted directly on the hidden surface 28 of the lower trim panel portion 20 of the inner trim panel 18. This wire harness 50 includes various wires 52 and associated electrical connectors 54 for operating electrical components of the door such as the window regulator 34, a power operating locking mechanism, a vehicle seat control, etc. At the front end of the lower trim panel portion 20, the wire harness 50 includes an electrical connector 56 for connecting to an electrical connector of the associated vehicle body.

As shown in both FIGS. 1 and 2, the lower trim panel portion 20 of the inner trim panel 18 is also shown as including an audio speaker 58 mounted directly on the hidden surface 28 (FIG. 2) of the lower trim panel portion 20 of the inner trim panel 18. Furthermore, the upper trim panel portion 22 of the inner trim panel 18 has a front end 60 including a rearview mirror cover 61.

Figure 3:
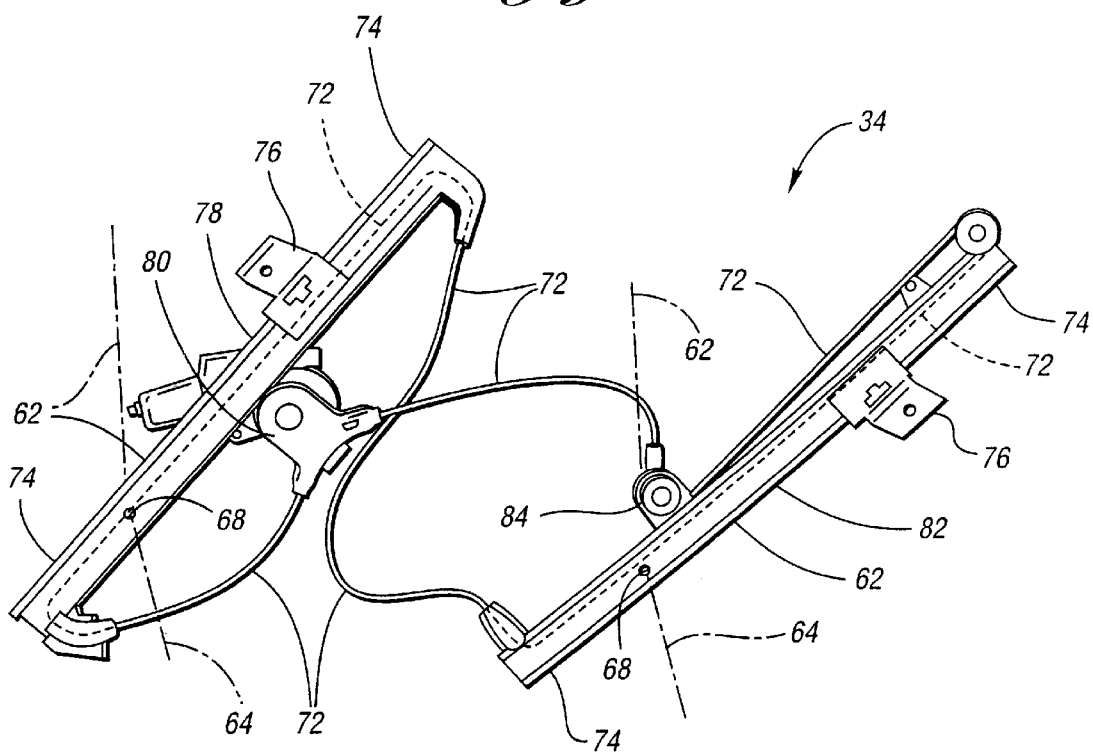
FIG. 3 is a perspective view of the preferred construction of a window regulator mechanism of the vehicle door subassembly and assembled vehicle door.

As illustrated in FIG. 2 and more specifically shown in FIG. 3, the window regulator mechanism 34 includes a pair of elongated window guides 62 for supporting an associated door window for vertical movement. A pair of pivotal connections 64 respectively mount the pair of window guides 62 for pivotal movement to facilitate installation of the vehicle door subassembly 16 on the associated vehicle door. The connections 64 as shown in FIG. 2 include studs 66 mounted on the lower trim panel portion 20 so as to extend through suitable openings 68 in the guide 62 and are secured by fasteners 70 in order to permit the pivotal movement thereof between the solid line indicated positions shown and the phantom line positions that are schematically illustrated. A cable 72 extends along each window guide 62 between ends 74 thereof and also extends between the pair of guides in a crossing manner. The cable 72 has a pair of window connectors 76 respectively associated with the pair of window guides to provide connection to an unshown door window. One of the window guides 72 includes an intermediate portion 78 having an electric drive motor 80 that drives the cable to move the window. The other window guide 62 includes an intermediate portion 82 including a pulley 84 over which the cable 72 extends to facilitate the pivoting of the pair of window guides for installation of the vehicle door subassembly.

With reference to FIG. 4, the method for making the vehicle door 10 includes the mounting of the vehicle door latch actuator mechanism 32 and the window regulator mechanism 34 directly on the hidden inner surface 28 of the lower portion 20 of the inner trim panel 18 previously described in connection with FIG. 2. The lower portion of the inner trim panel and the door hardware thereon is assembled to the metallic door outer structure 14 as previously described prior to securement by suitable fasteners of the upper portion 22 of the inner trim panel to the door outer structure above the lower portion of the inner trim panel as shown in FIG. 1. The method also involves mounting of the wire harness 50 previously described to the lower trim panel portion 20 of the inner trim panel 18.

In the preferred practice of the vehicle door making method, the lower portion 20 of the inner trim panel 18 is initially supported on a lower extremity 86 of the outer door structure 14 as shown in FIG. 4. More specifically, this support is preferably provided by hooks 80 on the lower trim panel portion 20 of the inner trim panel 18 with the hooks 80 extending into an opening 88 of the door outer structure 12. Thereafter, the lower trim panel portion 20 is pivoted toward the inner side 14 of the door outer structure 12 and is secured in position. Prior to such positioning, the opening 88 as shown in FIG. 4 permits access into the interior of the door for final assembly of the hardware and other door components and may be further secured by fasteners to the outer door structure. After movement of the window regulator mechanism 34 into the opening 88, the elongated guides 62 of the window regulator mechanism are pivoted to their assembled position and secured by suitable fasteners to the door outer structure 12. Furthermore, the latch 46 is secured by threaded fasteners to the door outer structure and the handle assembly 48 is secured to the upper trim panel portion by suitable fasteners. The electrical connectors 54 are also connected and the vehicle door glass is installed. The pivoting of the window regulator guides 62 facilitates movement through the outer door structure opening 88 and consequently facilitates assembly of the door.

While the best mode for carrying out the invention has been described in detail, those familiar with the art to which the invention relates will recognize various alternative designs and embodiments for practicing the invention as defined by the following claims.

What is claimed is:

1. A method for making a vehicle door, comprising:

mounting vehicle door hardware including a door latch actuator mechanism and a window regulator mechanism directly to an inner hidden surface of a lower portion of an inner trim panel;

assembling the lower portion of the inner trim panel and the door hardware to a metallic door outer structure; and finally securing an upper portion of the inner trim panel to the door outer structure above the lower portion of the inner trim panel.

2. A method for making a vehicle door as in claim 1 wherein a wire harness is mounted directly on the hidden surface of the lower trim panel portion of the inner trim panel.

3. A method for making a vehicle door as in claim 1 wherein a lower extremity of the lower portion of the inner trim panel is initially support on a lower extremity of the outer door structure and the lower portion of the inner trim panel subsequently being pivoted into position for the securement to the door outer structure.

4. A method for making a vehicle door as in claim 1 wherein the upper portion of the inner trim panel is secured to the door outer structure with a front end having a rear view mirror cover.

5. A method for making a vehicle door, comprising:

mounting vehicle door components including hardware including a door latch actuator mechanism and a window regulator mechanism and a wire harness directly to an inner hidden surface of a lower portion of an inner trim panel;

assembling the lower portion of the inner trim panel with the door hardware and wire harness thereof to a metallic door outer structure; and finally securing an upper portion of the inner trim panel to the door outer structure above the lower portion of the inner trim panel.

\* \* \* \* \*